US007254602B1

(12) United States Patent
Boivie

(10) Patent No.: US 7,254,602 B1
(45) Date of Patent: Aug. 7, 2007

(54) MULTICAST ENABLED WEB CONTENT DISTRIBUTION

(75) Inventor: Richard H Boivie, Monroe, CT (US)

(73) Assignee: International Business Machines Corporation, Armonk, NY (US)

(*) Notice: Subject to any disclaimer, the term of this patent is extended or adjusted under 35 U.S.C. 154(b) by 1351 days.

(21) Appl. No.: 09/696,116

(22) Filed: Oct. 25, 2000

(51) Int. Cl.
 *G06F 15/16* (2006.01)
(52) U.S. Cl. .................. 709/201; 709/238; 709/239
(58) Field of Classification Search ............... 703/201, 703/203, 238–239, 217–219, 230, 233; 370/352, 370/408, 356; 709/201, 203, 238–239, 230–233, 709/217–219
 See application file for complete search history.

(56) References Cited

U.S. PATENT DOCUMENTS 6,578,088 B2 * 6/2003 Ohno et al. .................. 709/245

OTHER PUBLICATIONS

Rick Boivie et al, "Small group Multicast: a new solution for multicasting on the Internet", IEEE Internet computing, p. 75, p. 79, May 2000.*
H-Peter Dommel et al, "Ordered end to end multicast for distributed multimedia system", System Sciences, proceeding of 33rd Hawaiii Internet conference, Jan. 2000.*

* cited by examiner

*Primary Examiner*—Andrew Caldwell
*Assistant Examiner*—Benjamin Ailes
(74) *Attorney, Agent, or Firm*—Casey August; Jose Gutman; Fleit Kain Gibbons Gutman Bongini & Bianco P.L.

(57) ABSTRACT

A method for distributing web content efficiently across a network of information processing units and intermediate nodes. The method on an information processing unit includes receiving a web content object created by a user that is to be distributed to a set of destinations. Also, the method further includes sending a single copy of the web content object across the network via intermediate nodes to a set of destinations using a reliable multicast technique. Also, the invention includes receiving a packet on an intermediate node where the packet contains address information for a set of destinations. Also, the invention includes determining at an intermediate node the next hop or next hops that the packet should be forwarded to and forwarding a copy of the packet to each of those next hops.

8 Claims, 7 Drawing Sheets

200

Prior Art

400a

MULTICAST ENABLED WEB CONTENT DISTRIBUTION

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS REFERENCE TO RELATED APPLICATIONS

This application generally relates to the teachings of U.S. Pat. No. 6,415,312, entitled "Reliable Multicast For Small Groups" filed on Jan. 29, 1999, and of U.S. Pat. No. 6,502,140, entitled "Multicast Support For Small Groups", filed on Jan. 29, 1999, and of U.S. Pat. No. 6,625,773, entitled "System For Multicast Communications In Packet Switched Networks" filed on Jun. 9, 1999, which are all assigned to the same assignee as this application and the collective teachings of which are herein incorporated by reference.

BACKGROUND OF THE INVENTION

1. Field of the Invention

The invention generally relates to improvements in web based communication, and more particularly, the invention relates to an improved method and apparatus for distribution of web content.

2. The Prior Art

The World Wide Web (WWW) has become an important means of communication. In the use of the World Wide Web, the scaling of the delivery of web content to large numbers of users has become an important problem. In particular, content distribution networks such as those of Akamai scale the delivery of web content through the use of "secondary" web servers or "web caches" that are deployed throughout the Internet. A user request is directed to one of the secondary web servers that is "close" to the user. This allows a web site on the Internet to support large numbers of users and minimizes response times and network bandwidth requirements since much of the content is delivered from a secondary web server that is close to the user. Since the content that is delivered from a secondary web server needs to be correct and up-to-date, up-to-date content needs to be delivered to the secondary servers by some means. Today, this is typically done via TCP/IP and a TCP connection is used to copy content from the primary web server to a secondary web server.

FIG. 1 illustrates a prior art system of web content distribution (100) in which a separate copy of the content is sent to each of the secondary web servers. The web content distribution system as shown in FIG. 1 comprises a plurality of client machines (102, 110a to 110x) comprising personal computers, DOS machines, WINDOWS machines, Macintosh machines, Linux machines and dumb terminals. Also, the prior art web content distribution system of FIG. 1 further comprises a plurality of servers (104, 108a to 108n) and a plurality of routers (106a to 106f).

A web content object (114) is composed on a client computer (102) and transferred to a primary web server (104). Then from the web server (104), the web content object (114) is copied to secondary web servers (108a to 108n). Alternatively, the web content object (114) might be copied directly from client computer (102) to the secondary web servers (108a to 108n).

FIG. 2 illustrates a prior art functional sequence (200) of a web content distribution system. First, a web content object (114) is created (202) at a client machine (102). Then the web content object (114) is copied to each secondary server to each of the secondary servers.

Today, content distribution service providers like Akamai, use TCP (Transmission Control Protocol) to push content out to the web caches. Using TCP means that the same web content is repeatedly pushed out from the source for each web cache.

Since the distribution of web content to web caches consumes a significant amount of bandwidth and since the bandwidth consumed is expected to increase as web content incorporates more video clips and other high-bandwidth components, there is a need for a mechanism that can more efficiently deliver content to secondary web servers or web caches. A more efficient content delivery system can reduce network bandwidth costs and allow a network to support more content, more users and more applications.

SUMMARY OF THE INVENTION

A method for distributing a web content object efficiently across a network. The method on a source machine, which can be a client computer or a primary web server includes the transmission of a web content object via a reliable multicast mechanism. Also, the method further includes sending a single copy of the web content object across the network via intermediate nodes to a list of destinations using a reliable multicast technique. Also, the invention includes, on an intermediate node, receiving a multicast packet and replicating the packet and forwarding one or more copies in the direction of the various destinations.

BRIEF DESCRIPTION OF THE FIGURES

The subject matter which is regarded as the invention is particularly pointed out and distinctly claimed in the claims at the conclusion of the specification. The foregoing and other aspects, features, and advantages of the invention will be apparent from the following detailed description taken in conjunction with the accompanying drawings.

DETAILED DESCRIPTION OF THE PREFERRED EMBODIMENTS

Figure 1:
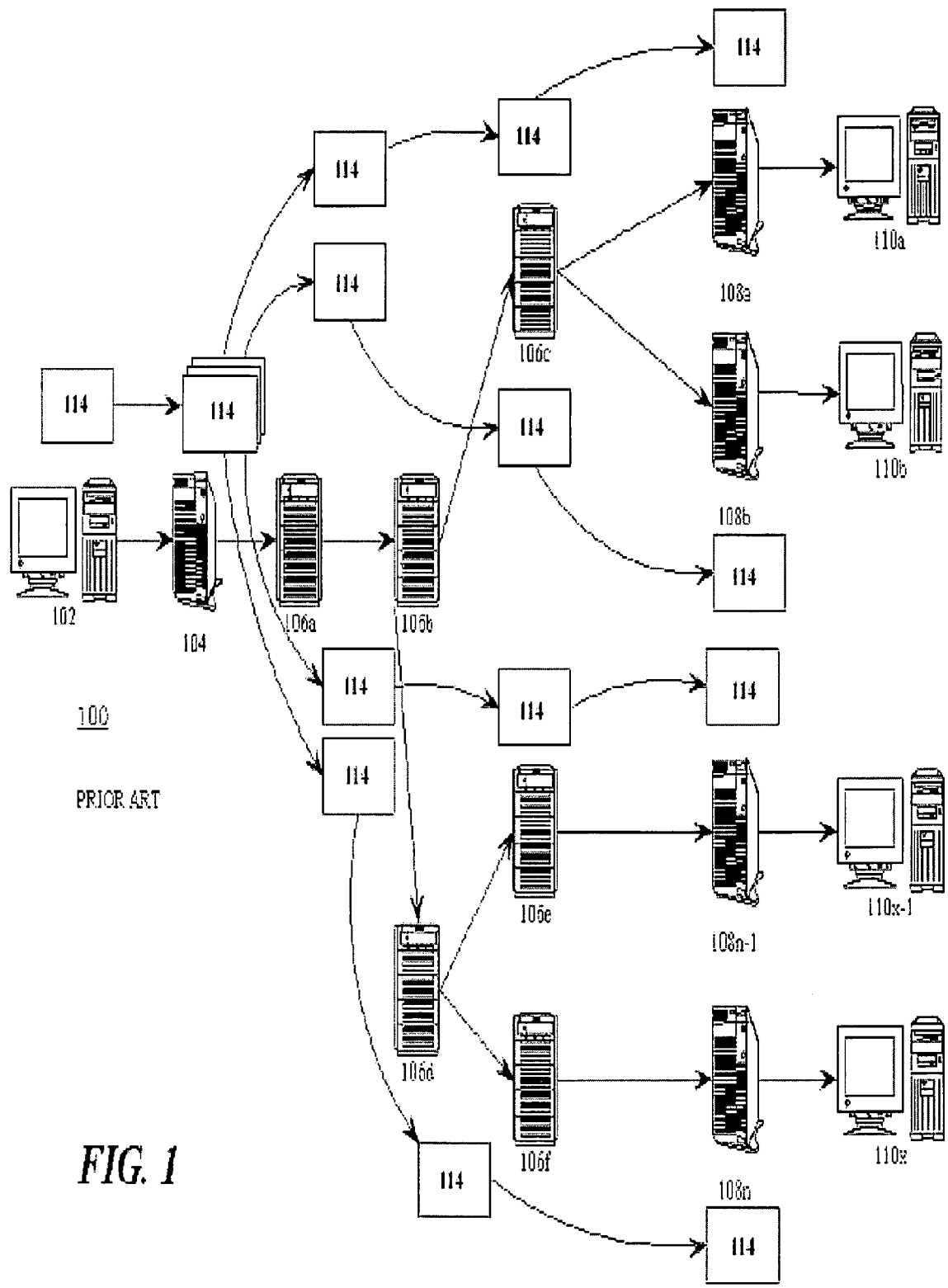
FIG. 1 illustrates a prior art system of web content object distribution in which separate transmissions are used to copy a web content object to a set of secondary web servers.
Figure 2:
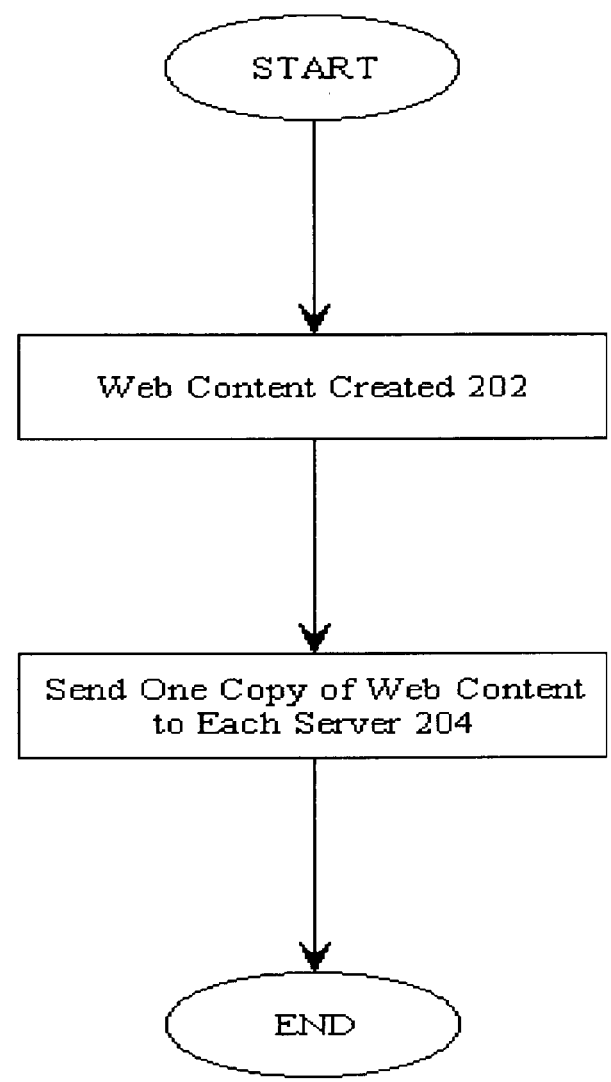
FIG. 2 illustrates a prior art functional sequence of a web content distribution system.

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

In the drawing like numerals refer to like parts through several views.

Exemplary Embodiment Multicast Enabled Web Content Distribution

Figure 3:
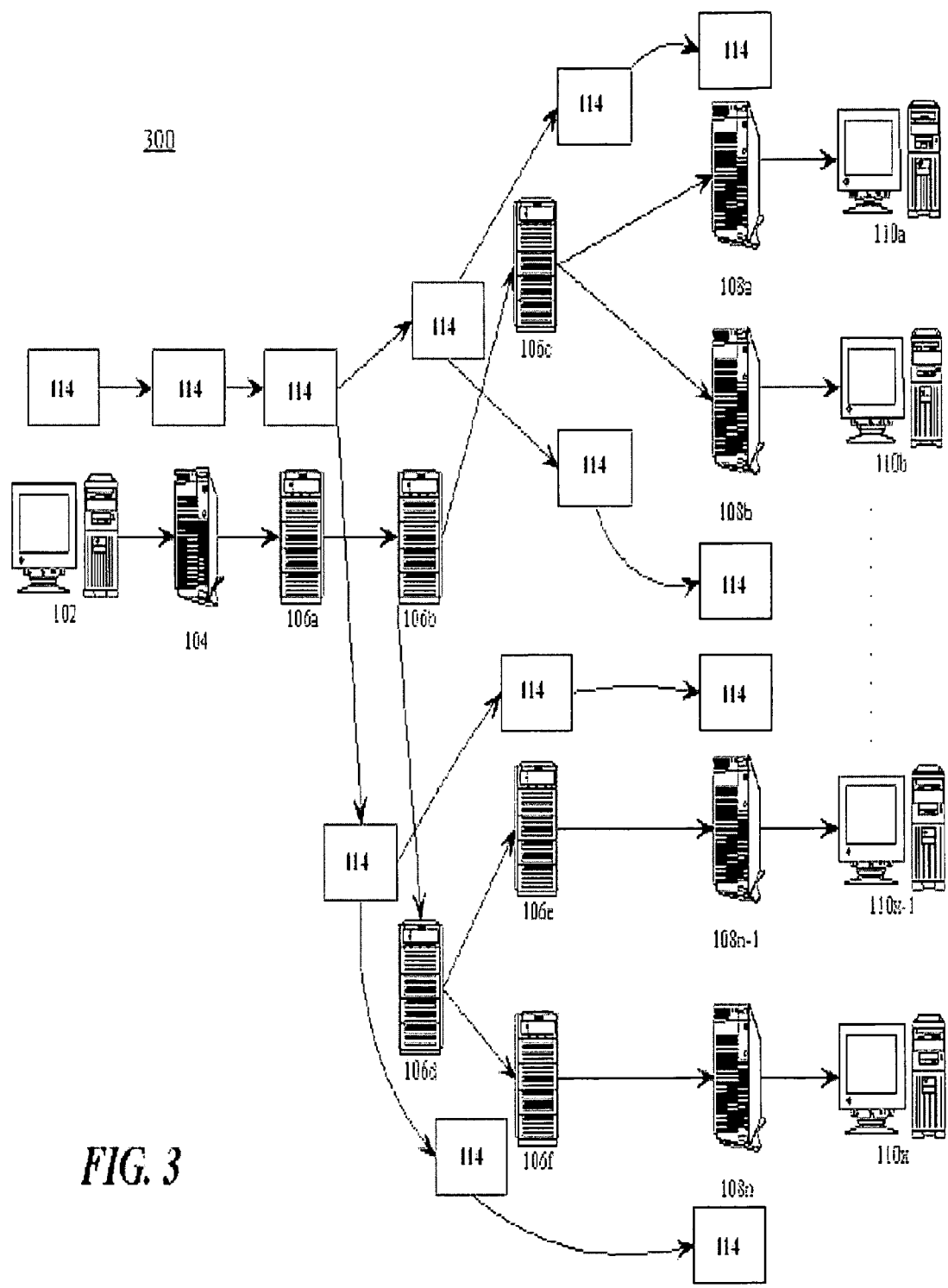
FIG. 3 illustrates a web content distribution system according to a preferred embodiment of the present invention.

FIG. 3 illustrates an exemplary web content distribution system (300) according to a preferred embodiment of the present invention. The web content distribution system as shown in FIG. 3 comprises a plurality of client machines (102, 110a to 110x) comprising personal computers, DOS machines, WINDOWS machines, Macintosh machines, Linux machines, dumb terminals, cellular telephones, PDA's, and other terminal devices. Client machines (102, 110a to 110x) may also be referred to herein as client computers or as information processing units.

An information processing unit (102, 110a to 110x), according to a preferred embodiment of the present invention, comprises a reception unit for receiving a web content object and a transmission unit for transmitting a copy of the web content object into a network. A reception unit, according to one preferred embodiment of an information processing unit, may comprise a user interface for receiving a web content object composed by a user. Alternatively, the reception unit may comprise other types of interfaces for receiving and for storing a web content object, or a collection of packets representing a web content object, destined for transmission as a web content object in the web content distribution system (300). The transmission unit may comprise, according to a preferred embodiment of the present invention, at least one of a modem, a network interface, a transceiver, a wireless transceiver, and other interfacing hardware and software.

Also, the improved web content distribution system of FIG. 3 further comprises a plurality of servers (104, 108a to 108n) and a plurality of routers (106a to 106f). Servers (104, 108a to 108n) and routers (106a to 106f) may also be referred to herein as intermediate nodes of the web content distribution system (300). An intermediate node, according to a preferred embodiment of the present invention, comprises a reception unit that includes a network interface for receiving and for storing a web content object, or packets representing a web content object, destined for transmission as a web content object in the web content distribution system (300). The intermediate node typically includes a processor operating according to software programs and memory coupled to the processor for storing information accessible by the processor. The processor utilizes software programs in the memory for determining whether to forward received web content information to other nodes in the network. The processor receives web content information, such as packets, and stores this web content information in the memory. After determining a "next hop" for this web content information, the processor forwards a copy of the web content information, e.g., packets, to another node in the network. Additionally, according to an alternative preferred embodiment, the processor acknowledges ACK and/or NAK signals and retransmits packets as may be necessary to forward a web content object, e.g., one or more packets, to another node in the network. Also, for reception of web content object information, e.g., one or more packets, the processor utilizes ACK and/or NAK signals to communicate with another node in the network, such as to coordinate retransmission of packets in the network.

A web content object (114) is typically composed on a client computer (102) and transferred to a primary web server (104). From the primary web server (104) it is copied to secondary web servers (108a to 108n) via a reliable multicast mechanism, such as the Reliable Small Group Multicast (Reliable SGM) protocol such as described in patent application Ser. No. 09/329,101, filed on Jun. 9, 1999. Alternatively, the web content object might be copied directly from client computer (102) to the secondary web servers (108a to 108n), preferably using a reliable multicast mechanism, such as the Reliable SGM protocol such as described in application Ser. No. 09/329,101. In either exemplary case, the source of the multicast transmission (which can be the client machine (102) or the primary web server (104) sends a single stream of packets to transmit the web content to the secondary web servers (108a to 108n) using a reliable multicast mechanism. In either case, the source of the multicast packets sends a single stream of packets which are replicated at intermediate nodes acting as multicast routers so that an appropriate stream of packets reaches each of the desired secondary web servers (108a to 108n). For example in FIG. 3, intermediate node (106c) receives one or more packets from (106b) and forwards copies of the packet or packets on to (108a) and (108b). The intermediate nodes that are acting as multicast routers preferably use SGM protocol as described in patent application Ser. No. 09/329,101, filed on Jun. 9, 1999, or another multicast mechanism. The intermediate nodes that are acting as multicast routers, according to a preferred embodiment could be IP routers or servers or other nodes that have been augmented with appropriate multicast functionality. Once the web content is available on the secondary web servers (or web caches), it can be returned to client computers (110a to 110x) directly from those secondary web servers (or web caches) as in existing content distribution systems. Since at most one copy of the web content (and at most one copy of any portion of the web content) traverses any link in the network, the web content distribution system of FIG. 3 will be more efficient in terms of network bandwidth than existing web content distribution systems such as shown in FIG. 1.

Web Content Application Program Functionality

Figure 4A:
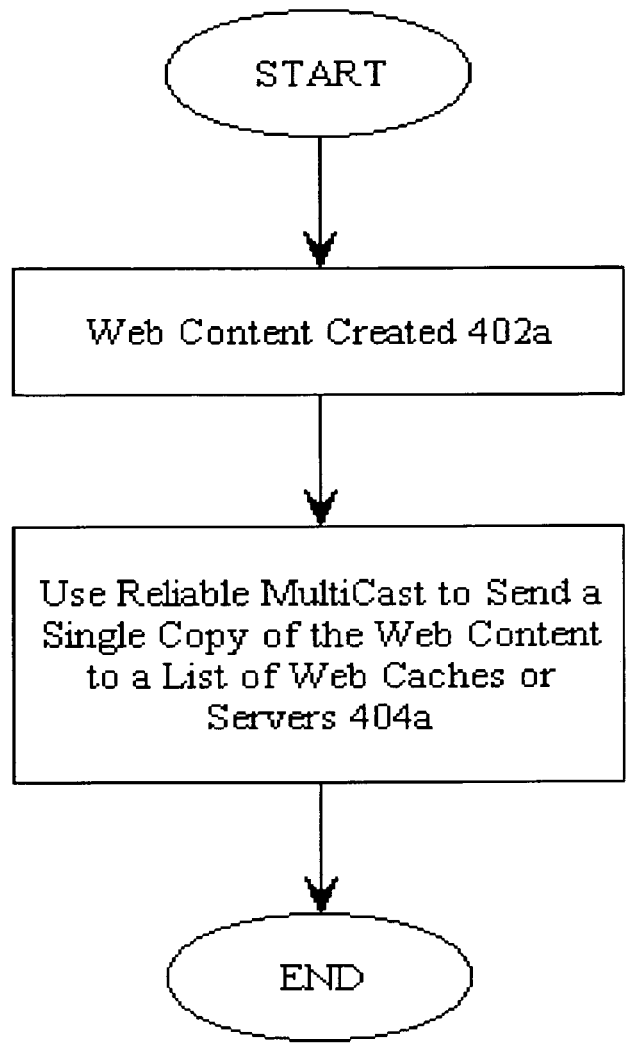
FIG. 4a illustrates an exemplary functional sequence of a web content distribution application program in accordance with a preferred embodiment of the present invention.

FIG. 4a illustrates an operational sequence (400a) of a web content objects application program according to a preferred embodiment of the present invention. First, a web content object (114) is created (402a) and then the web content object (114) is distributed (404a) using a reliable multicast mechanism. As mentioned above, the reliable multicast mechanism, according to a preferred embodiment of the present invention, utilizes the Reliable SGM mechanism as described in patent application Ser. No. 09/329,101, filed on Jun. 9, 1999, or using another mechanism for reliable multicast. Also as discussed above, the source of the multicast transmission can be, for example, a client computer (102) or a web server (104).

Reliable Multicast Software Functionality

Figure 4B:
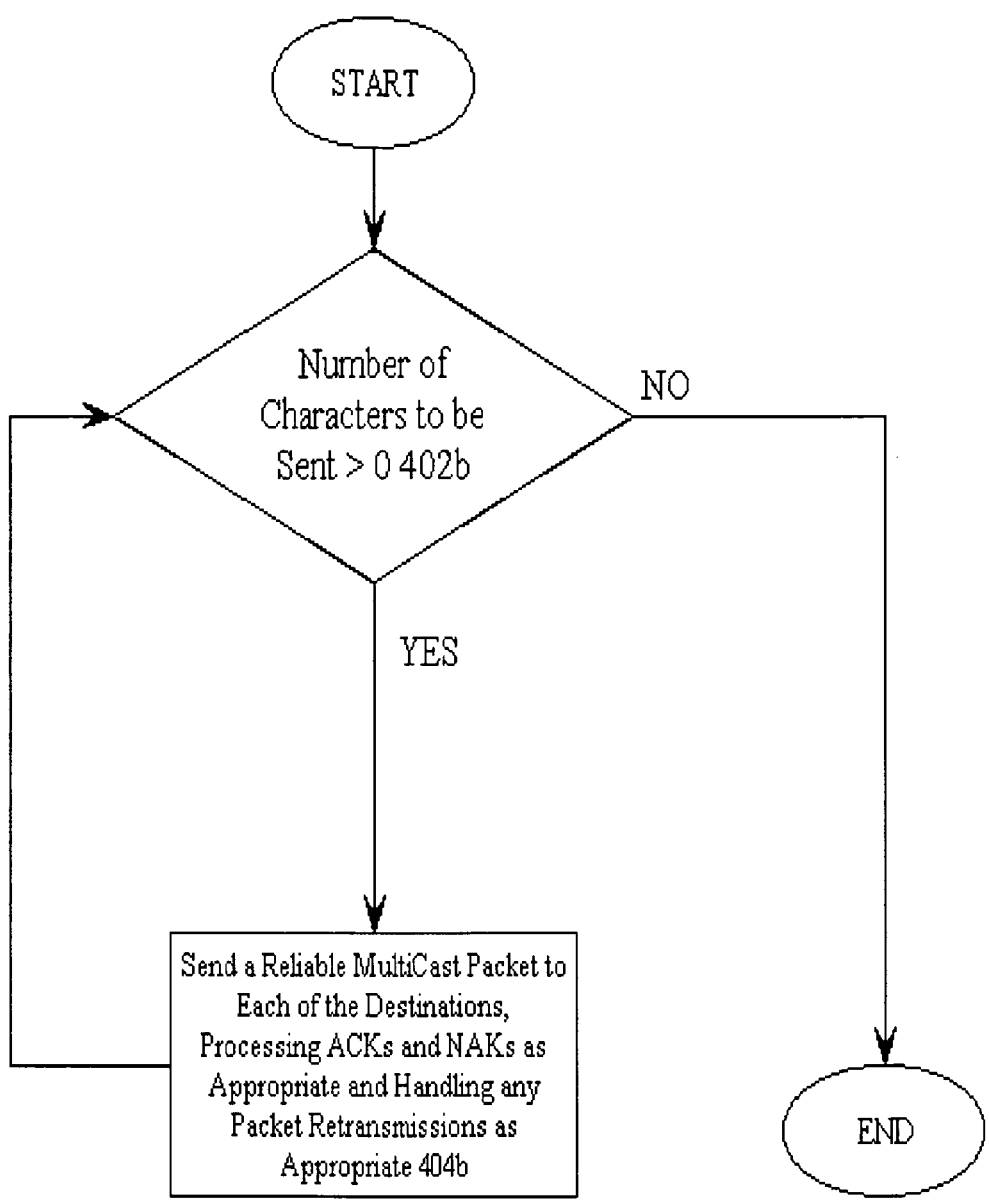
FIG. 4b illustrates an exemplary functional sequence of a reliable multicast software according to a preferred embodiment of the present invention.

FIG. 4b illustrates a functional sequence (400b) of a reliable multicast software package according to a preferred embodiment of the present invention. This reliable multicast software package might reside on a client computer (102) or on a server (104). First a determination is made as whether there are more characters (i.e., more of a web content object) to be transmitted (402b). If there are no more characters (i.e., more web content object) to be transmitted then the process ends. However, if there are more characters (i.e., more web content object) to be transmitted then the process sends a multicast packet to the destinations (404b). The reliable multicast software might also, in certain alternative embodiments, process acknowledgment packets or ACKs and/or negative acknowledgments or NAKs and perform re-transmissions as described as described in application Ser. No. 09/329,101. In other embodiments the ACKs and/or NAKs and re-transmissions might be handled by intermediate nodes such as routers. As mentioned above a variety of different reliable multicast schemes are possible. Error detection and correction protocols may also be used as is well known in the art. For specific implementations, the particular choice of a reliable multicast mechanism and the particular choices for error detection and correction protocols should be obvious to one of ordinary skill in the art in view of the discussion above.

Intermediate Node Multicast Functionality

Figure 4C:
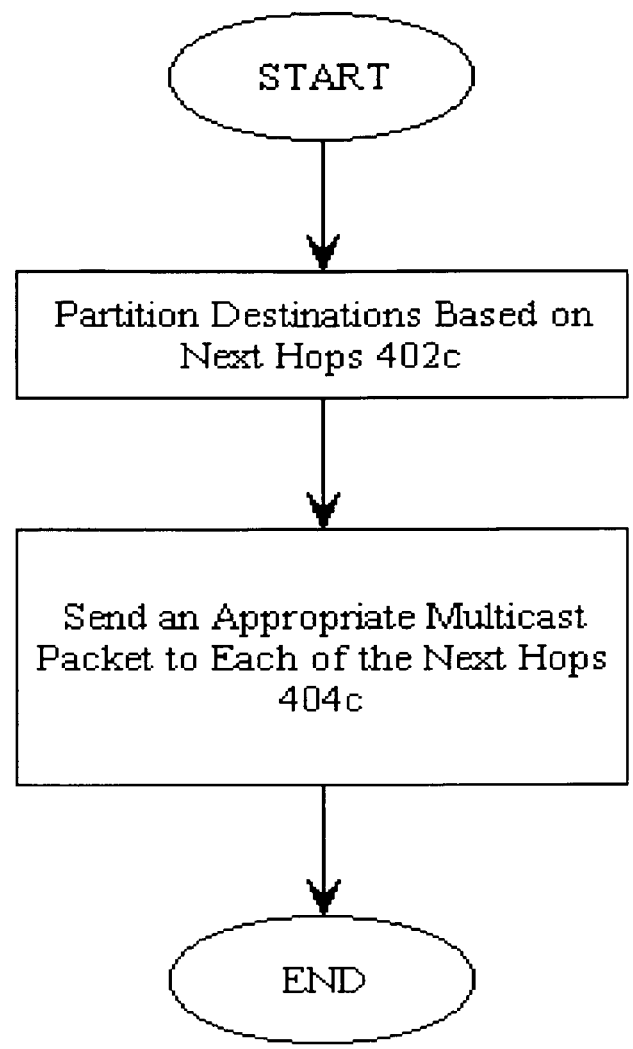
FIG. 4c illustrates an exemplary operational sequence for intermediate nodes in a web content distribution system in accordance with a preferred embodiment of the present invention.

FIG. 4c illustrates a functional sequence (400c) of multicast software as practiced by the invention on intermediate nodes utilizing the reliable SGM mechanism according to a preferred embodiment of the present invention. First, when a packet is received, for example, destinations are partitioned (402c) based on the next node that a packet should be forwarded to for delivering to each destination. This next node is also known as a "next hop" that the packet should be forwarded to for delivering to each destination. According to a preferred embodiment, a "next hop" comprises a node, which can be an intermediate node or a destination node, to which a packet should be transmitted in a multicast transmission. Then, an appropriate multicast packet is sent (404c) to each of these "next hops", preferably as described in application Ser. No. 09/329,101. As mentioned above, the intermediate node multicast routing capability can be implemented on IP routers, servers or other nodes.

Web Content Object

Figure 5:
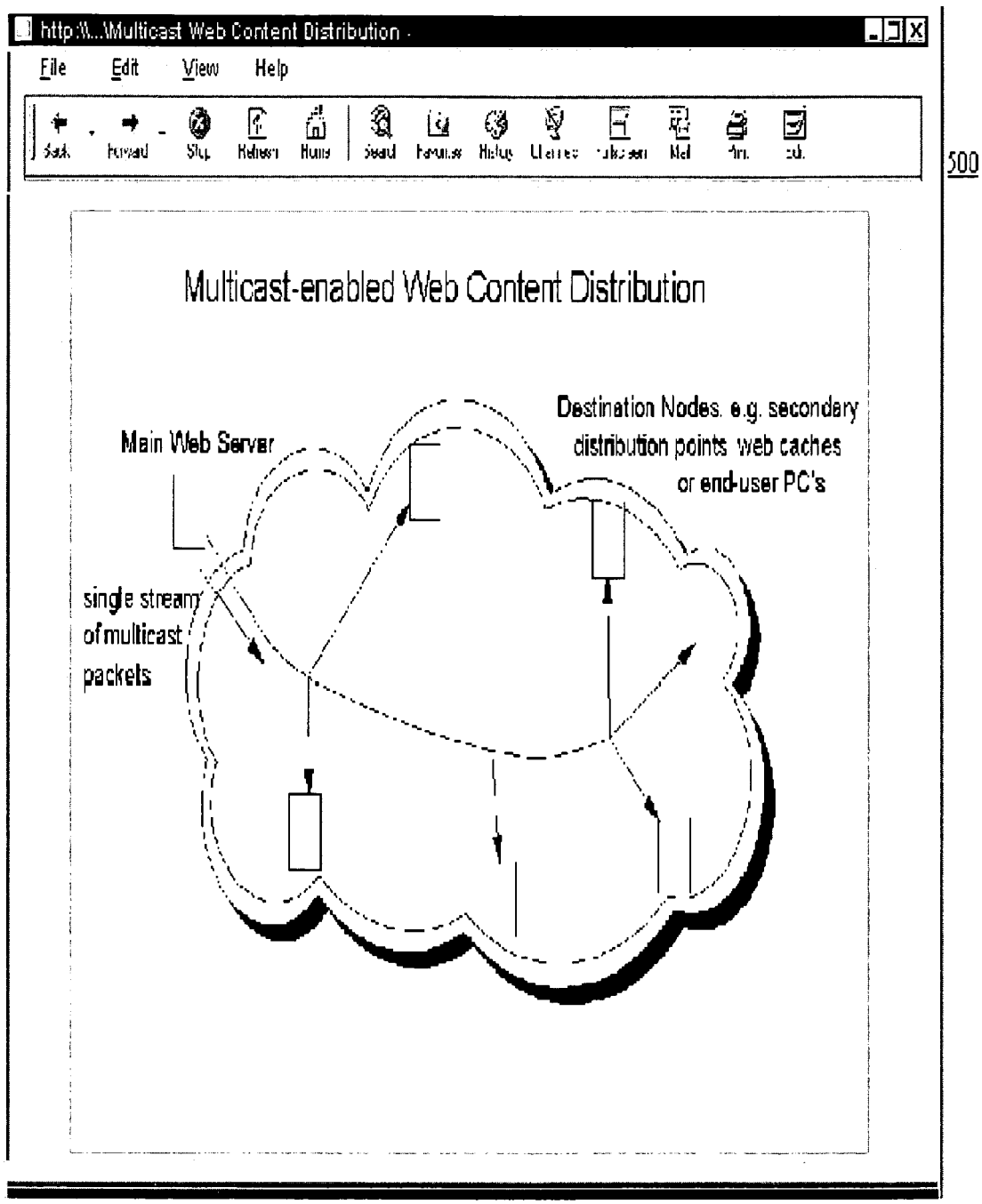
FIG. 5 illustrates an exemplary distribution of web content using a web content distribution system in accordance with a preferred embodiment of the present invention.

FIG. 5 illustrates the distribution of a web content object (500) using a web content distribution system (300) as shown in FIG. 3. The exemplary web content object (500) of FIG. 5 includes audio and video graphics that are not shown in FIG. 5.

Conclusion

Multicast-enabled web content distribution preferably uses a reliable multicast scheme, such as Reliable Small Group Multicast or other reliable multicast scheme to improve efficiencies in the distribution of web content. Multicast-enabled web content distribution can be used to reduce the cost of network bandwidth in the Internet or in an enterprise network or to increase the usefulness of the existing bandwidth in a network by making it possible to support more users or more applications in a given amount of network bandwidth.

Discussion of Hardware and Software Implementation Options

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for distributing web content objects across a network of information processing units and intermediate nodes, the method on an intermediate node comprising the steps of:

receiving a multicast packet;

determining one or more "next hops" that the multicast packet should be forwarded to;

forwarding one copy of the multicast packet to each of the "next hops";
sending one or more ACKs or NAKs or both between an intermediate node and another node of a network for reliably delivering a multicast packet to a destination information processing unit; and
repetitively executing the determining and forwarding steps for a plurality of one or more multicast packets.

2. The method as defined in claim 1, wherein the determining and forwarding steps use a Small Group Multicast scheme.

3. The method as defined in claim 1, further comprising the steps of:
processing one or more ACKs or NAKs or both from a reliable multicast packet transmission; and
performing multicast packet retransmissions based on the processed one or more ACKs or NAKs or both.

4. The method as defined in claim 1, wherein the multicast packet comprises a small group multicast packet.

5. A non-volatile computer readable medium or volatile computer readable medium, excluding network circuits, including instructions for distributing web content objects across a network of information processing units and intermediate nodes, the non-volatile computer readable medium or volatile computer readable medium, excluding network circuits, comprising instructions for:
receiving a multicast packet containing address information for a set of destinations;
determining the "next hops" for those destinations;
replicating the multicast packet for each "next hop";
sending one or more ACKs or NAKs or both between an intermediate node and another node of a network for reliably delivering a multicast packet to a destination information processing unit;
forwarding a copy of the multicast packet to each "next hop"; and
repetitively executing the determining, replicating and forwarding steps for each newly received multicast packet.

6. The non-volatile computer readable medium or volatile computer readable medium, excluding network circuits, as defined in claim 5, further comprising the instructions for:
processing one or more ACKs or NAKs or both from a reliable multicast packet transmission; and
performing multicast packet retransmissions based on the processed one or more ACKs or NAKs or both.

7. An intermediate node for distributing web content objects across a network of information processing units and intermediate nodes, the intermediate node comprising:
a reception unit for receiving a multicast packet containing address information for a set of destinations;
a determination unit for determining a "next hop" for each of the destinations;
a copying unit for replicating the multicast packet for each of the "next hops";
a processor for sending one or more ACKs or NAKs or both between the intermediate node and another node of a network for reliably delivering a multicast packet to a destination information processing unit;
a forwarding unit for forwarding a copy of the multicast packet to each of the "next hops"; and
a repeater unit for repetitively executing the determining, replicating and forwarding for a plurality of multicast packets.

8. The intermediate node as defined in claim 7, further comprising:
an acknowledgement unit for processing one or more ACKs or NAKs or both from a reliable multicast transmission; and
a retransmit unit for handling packet retransmissions based on the processed one or more ACKs or NAKs or both.

* * * * *